US009220256B2

(12) United States Patent
Walsh et al.

(10) Patent No.: US 9,220,256 B2
(45) Date of Patent: Dec. 29, 2015

(54) RETRACTING TUNNEL RODENT TRAP

(71) Applicant: OMS Investments, Inc., Los Angeles, CA (US)

(72) Inventors: James R. Walsh, Wauwatosa, WI (US); Daniel C. Johnson, Madison, WI (US)

(73) Assignee: OMS INVESTMENTS, INC., Los Angeles, CA (US)

( * ) Notice: Subject to any disclaimer, the term of this patent is extended or adjusted under 35 U.S.C. 154(b) by 144 days.

(21) Appl. No.: 13/738,008

(22) Filed: Jan. 10, 2013

(65) Prior Publication Data

US 2014/0190068 A1   Jul. 10, 2014

(51) Int. Cl.
*A01M 23/08* (2006.01)
*A01M 23/30* (2006.01)

(52) U.S. Cl.
CPC ..................... *A01M 23/30* (2013.01)

(58) Field of Classification Search
CPC ..... A01M 23/02; A01M 23/08; A01M 23/16; A01M 23/24; A01M 23/30; A01M 27/00
USPC ...................... 43/77, 78, 79, 82, 83
IPC .................... A01M 23/02, 23/08, 23/16, 23/24, A01M 27/00
See application file for complete search history.

(56) References Cited

U.S. PATENT DOCUMENTS

| | | | | |
|---|---|---|---|---|
| 282,463 | A | * | 7/1883 | Lutz ................................. 43/82 |
| 2,005,489 | A | * | 6/1935 | Barrett ............................. 43/80 |
| 4,026,064 | A | | 5/1977 | Baker |
| 4,127,958 | A | | 12/1978 | Peters |
| 4,231,180 | A | | 11/1980 | Bare |
| 4,418,493 | A | | 12/1983 | Jordan |
| 4,453,337 | A | | 6/1984 | Williams |
| 4,550,525 | A | | 11/1985 | Baker et al. |
| 4,658,536 | A | | 4/1987 | Baker |
| 4,660,320 | A | | 4/1987 | Baker et al. |

(Continued)

FOREIGN PATENT DOCUMENTS

| | | |
|---|---|---|
| EP | 745323 A1 | 12/1996 |
| EP | 1057958 A2 | 12/2000 |

(Continued)

OTHER PUBLICATIONS

Combined Search and Examination Report dated Sep. 16, 2013 and Sep. 17, 2013.

(Continued)

*Primary Examiner* — Lisa Tsang
(74) *Attorney, Agent, or Firm* — Hunton & Williams LLP

(57) ABSTRACT

A rodent trap covered base defines an enclosed interior accessible through a sliding plastic tunnel defining a passageway for rodents into the interior. The tunnel has a projecting strike member, and is biased by an underlying spring to a retracted position. A trigger engaging member extends from the tunnel to be retained by a catch on a trigger mounted to the base. When a rodent passes through the tunnel into the base interior, it is directed by barriers towards a rodent attracting bait. To reach the bait, the rodent must press against a pivotably mounted trigger, thereby dislodging the trigger from the trigger engaging member which releases the tunnel to be driven by the spring to retract along parallel tracks to bring the strike plate forcibly against the rodent within the trap, usually killing it, and closing the trap, which is then presented covered within the trap for disposal.

9 Claims, 3 Drawing Sheets

(56) References Cited

U.S. PATENT DOCUMENTS

| | | | |
|---|---|---|---|
| 5,005,313 | A | 4/1991 | Lindros, Jr. |
| 5,040,327 | A | 8/1991 | Stack et al. |
| 5,044,111 | A | 9/1991 | Lindros, Jr. |
| 5,044,113 | A | 9/1991 | Stack et al. |
| 5,136,803 | A | 8/1992 | Sykes et al. |
| 5,175,957 | A | 1/1993 | West |
| 5,272,832 | A | 12/1993 | Marshall et al. |
| 5,448,852 | A | 9/1995 | Spragins et al. |
| 5,481,824 | A | 1/1996 | Fiore, Jr. |
| 5,806,237 | A | 9/1998 | Nelson et al. |
| 5,960,585 | A | 10/1999 | Demarist et al. |
| 6,029,393 | A | 2/2000 | Stewart |
| 6,082,042 | A | 7/2000 | Issitt |
| 6,145,242 | A | 11/2000 | Simpson |
| 6,272,791 | B1 | 8/2001 | Pleasants |
| 6,397,517 | B1 | 6/2002 | Leyerle et al. |
| 6,493,988 | B1 | 12/2002 | Johnson |
| 6,513,283 | B1 | 2/2003 | Crossen |
| 6,807,768 | B2 | 10/2004 | Johnson et al. |
| 7,506,471 | B2 * | 3/2009 | Rodgers et al. ............ 43/85 |
| 7,607,254 | B1 * | 10/2009 | Huang ..................... 43/85 |
| 7,669,363 | B2 | 3/2010 | Frisch |
| 7,784,216 | B2 | 8/2010 | Kaukeinen et al. |
| 7,980,023 | B2 | 7/2011 | Nelson et al. |
| 7,987,629 | B2 | 8/2011 | Harper |
| 8,209,900 | B2 | 7/2012 | Vickery et al. |
| 8,683,738 | B2 | 4/2014 | Pryor et al. |
| 8,800,201 | B2 | 8/2014 | Vickery et al. |
| 2004/0244274 | A1 | 12/2004 | Dellevigne et al. |
| 2005/0028431 | A1 | 2/2005 | Hoyes et al. |
| 2006/0117644 | A1 | 6/2006 | Hoyes et al. |
| 2006/0185223 | A1 | 8/2006 | Watson et al. |
| 2007/0017149 | A1 | 1/2007 | Rodgers et al. |
| 2009/0151224 | A1 | 6/2009 | Nathan |
| 2009/0229170 | A1 | 9/2009 | Gaibotti |
| 2009/0307963 | A1 | 12/2009 | Abbas |
| 2010/0050498 | A1 | 3/2010 | Nelson et al. |
| 2010/0325940 | A1 | 12/2010 | Pryor et al. |
| 2011/0283600 | A1 | 11/2011 | Harper |
| 2012/0102821 | A1 | 5/2012 | Jovic et al. |
| 2012/0124891 | A1 | 5/2012 | Jovic et al. |
| 2013/0118056 | A1 | 5/2013 | Covington |
| 2013/0174471 | A1 | 7/2013 | Vickery et al. |
| 2013/0333273 | A1 | 12/2013 | Esculier |

FOREIGN PATENT DOCUMENTS

| | | |
|---|---|---|
| EP | 2100504 A2 | 9/2009 |
| FR | 2564287 A1 | 11/1985 |
| GB | 2063040 A | 6/1981 |
| GB | 2394642 A | 5/2004 |
| JP | 2009159938 A | 7/2009 |
| WO | WO 2005006857 A2 | 1/2005 |
| WO | WO 2009157027 A1 | 12/2009 |

OTHER PUBLICATIONS

International Search Report with Written Report from PCT/US2014/011075; May 5, 2014.

Written Opinion of the ISA and Search Report for Application No. PCT/US2014/011075 filed on May 5, 2014.

* cited by examiner

RETRACTING TUNNEL RODENT TRAP

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to rodent traps and more particularly to disposable mouse traps.

Mice within human habitations, particularly residences, present a perennial hazard to health and enjoyment of dwelling spaces. Many devices are known to capture and kill rodents. The conventional spring and bail kill trap can be very effective, but the exposed spring-loaded bail can be a hazard to pets and children. Moreover, consumers often prefer to avoid contact with the rodent once it has been killed, and for this purpose fully enclosed kill traps have been developed which freely admit rodents in a set configuration, but once triggered block off the trap entrance so that the dead rodent is not exposed, nor are the remains of the rodent able to extend from the trap. These traps provide a visual cue to their successful use, signaling the user to remove and dispose of the trap and its contents.

There is always a need for a rodent trap of this sort that, while effective, is also capable of being produced at low cost, and using automated procedures.

SUMMARY OF THE INVENTION

The rodent trap of this invention has a molded plastic base with a cover which defines an enclosed interior. The interior is accessible through a sliding plastic tunnel which offers a passageway with two entryways for rodents. The molded plastic tunnel has a projecting strike member, and is biased by an underlying spring to a retracted position. A trigger engaging member extends from the tunnel to be retained by the catch on a side-mounted trigger to hold the tunnel in an extended set configuration where a rodent may readily enter. When a rodent passes through the tunnel into the interior of the base, it is directed by barriers into a trigger compartment which presents a rodent attracting bait. To reach the bait, the rodent must press against a pivotably mounted trigger, thereby dislodging the trigger from the trigger engaging member which releases the tunnel to be driven by the spring to retract along parallel tracks to bring the strike plate forcibly against the rodent within the trap, usually killing it, and closing the trap, which is then presented for convenient disposal without exposing the dead rodent.

It is an object of the present invention to provide a mouse trap which effectively kills mice and thereafter screens the trap contents from view.

It is another object of the present invention to provide a rodent trap which is economically manufactured.

Further objects, features and advantages of the invention will be apparent from the following detailed description when taken in conjunction with the accompanying drawings.

DESCRIPTION OF THE PREFERRED EMBODIMENTS

Figure 1:
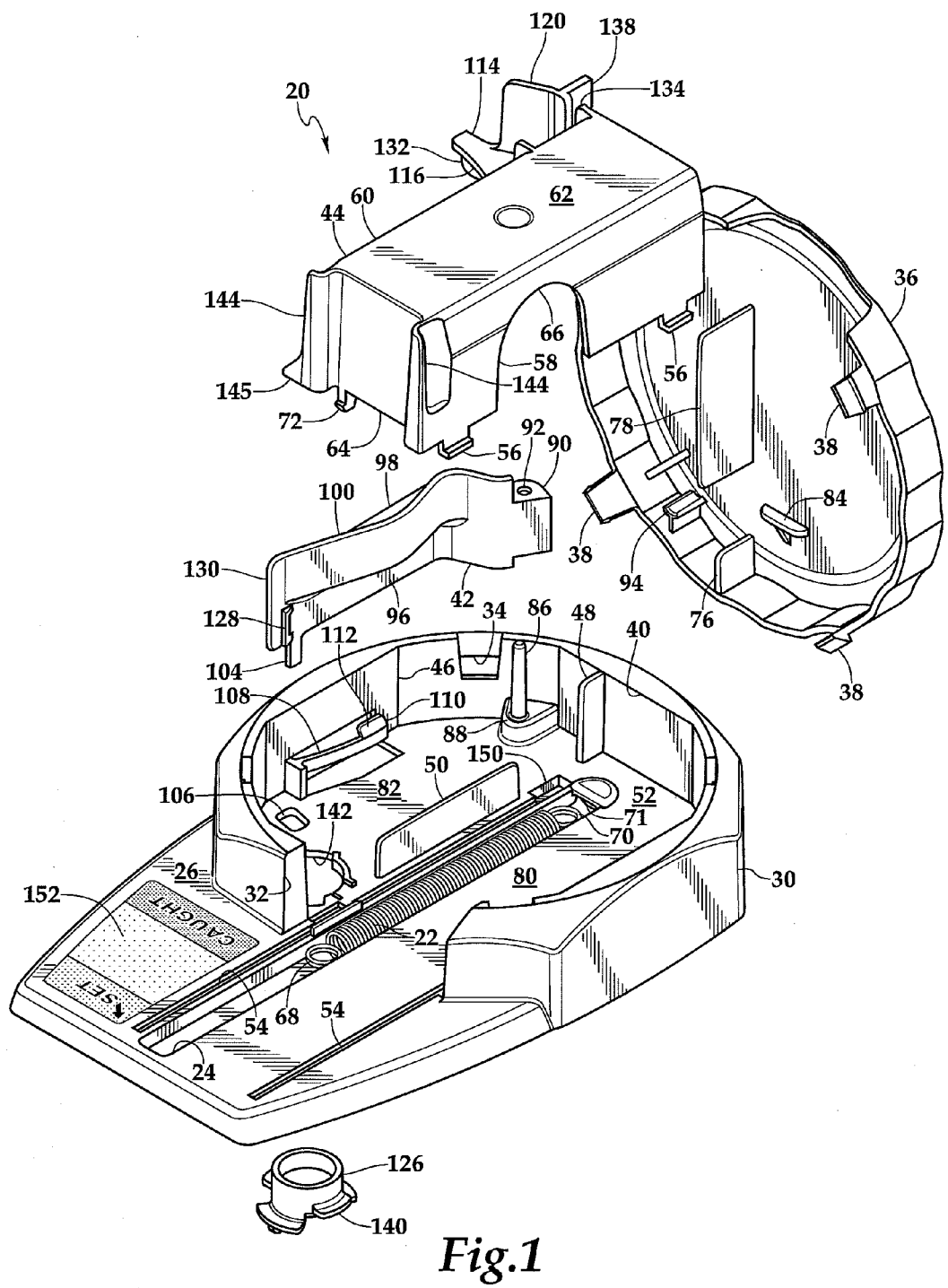
FIG. 1 is an exploded isometric view of the rodent trap of this invention.

Referring more particularly to FIGS. 1-4, wherein like numbers refer to similar parts, a rodent trap 20 is shown in FIG. 1. The rodent trap is economically assembled of six parts: a metal spring 22 and five molded plastic parts. The spring 22 is received within a recessed channel 24 formed in the projecting platform 26 of a plastic base 28. The base 28 has an upwardly protruding side wall 30. The side wall 30 has a front opening 32 and a number of barb-receiving ledges 34. A plastic lid 36 has protruding barbs 38 which engage with the barb-receiving ledges 34 to fix the lid to the base and to close off the trap 20 and define a trap interior 40.

Figure 2:
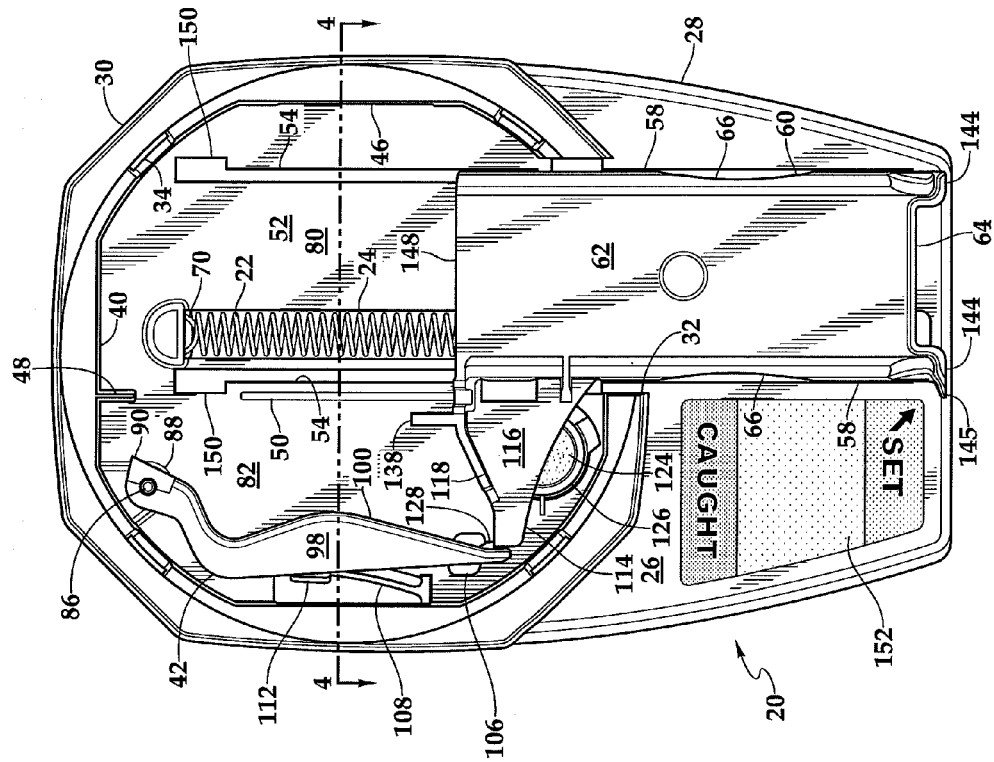
FIG. 2 is a top plan view, with the lid removed, of the rodent trap of FIG. 1 in a set configuration.

A trigger 42 is mounted within the base interior 40, and a slidable strike member 44 provides access to the base interior. As shown in FIG. 1, the base has an encircling interior wall 46 which extends around the interior. A stub wall 48 projects from the interior wall 46 rearwardly of the strike member 44, and is aligned with a lower barrier wall 50 which projects upwardly from the floor 52 of the base 28. Recessed beneath the floor 52 are two parallel guide tracks 54 which receive track-following flanges 56 which extend downwardly from the side walls 58 of a tunnel element 60 of the strike member 44. The tunnel element side walls 58 are joined to a tunnel top wall 62 and a tunnel end wall 64 to define an enclosed passageway which communicates with the trap interior 40. Each tunnel element side wall 58 has portions defining an arched opening or entryway 66, as shown in FIG. 2, which allows a rodent to enter from either side of the tunnel element. The tunnel element travels along the guide tracks under the urging of the spring when released from the trigger. The direction of tunnel element travel defines an axis, which is defined equidistant between the two side walls 58.

As shown in FIG. 1, the spring 22 has a forward loop 68 and a rear loop 70. The forward loop 68 is engaged by a hook 72 which extends downwardly from the end wall 64 of the tunnel element 60. The rear loop 70 of the spring 22 engages a spring hook 71 which protrudes downwardly from the base floor 52 adjacent the end of the spring channel 24. The spring 22 biases the strike member 44 into a retracted configuration, acting to accelerate the strike member towards a rodent within the trap 20 when the trigger 42 is tripped.

The lid 36 has a short stub wall 76 which extends downwardly close to the base stub wall 48, as well as an upper barrier wall 78 which extends near the base lower barrier wall 50. The lid and base stub walls 76, 48 and the lid and base barrier walls 78, 50, serve to define an entrance compartment 80 of the interior through which the tunnel element 60 extends, and a trigger compartment 82 within which is mounted the trigger 42.

A shallow tunnel stop 84 extends downward from the lid in a position rearward of the tunnel element 60. The tunnel stop 84 serves to limit the rearward travel of the strike member 44 by engaging the top wall 62 of the tunnel element as it moves rearwardly. As shown in FIG. 2, the trigger 42 is pivotably mounted to an upstanding pin 86 which, as best shown in FIG. 1, is supported on a platform 88 which extends from the base floor 52.

Figure 3:
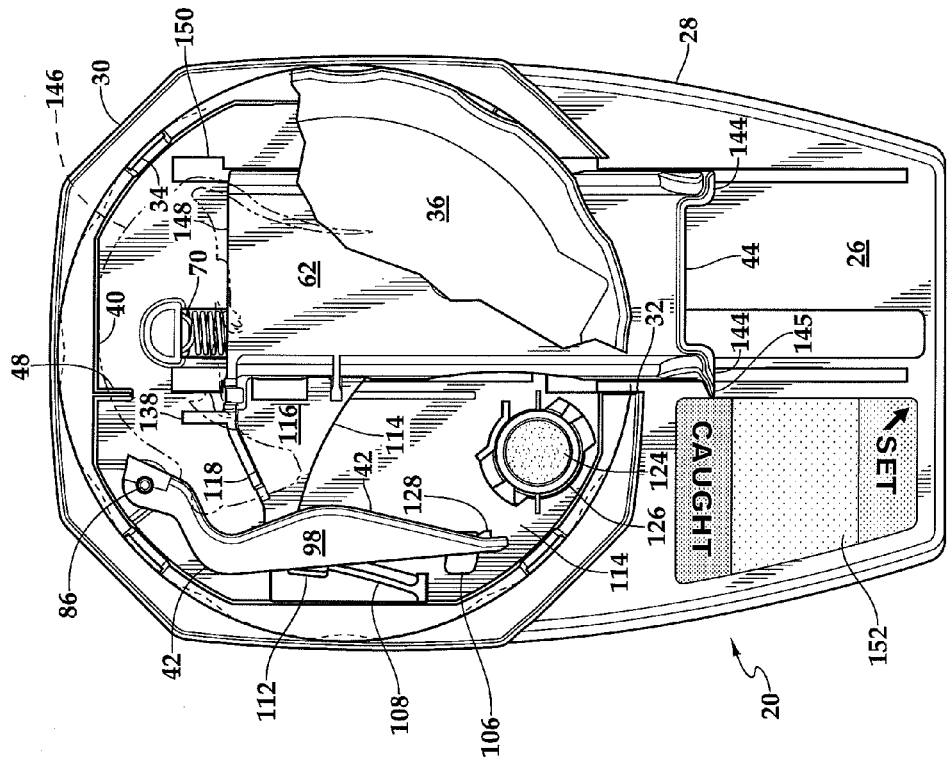
FIG. 3, is a top plan view, partially broken away in section, of the rodent trap of FIG. 1 in a triggered configuration.
Figure 4:
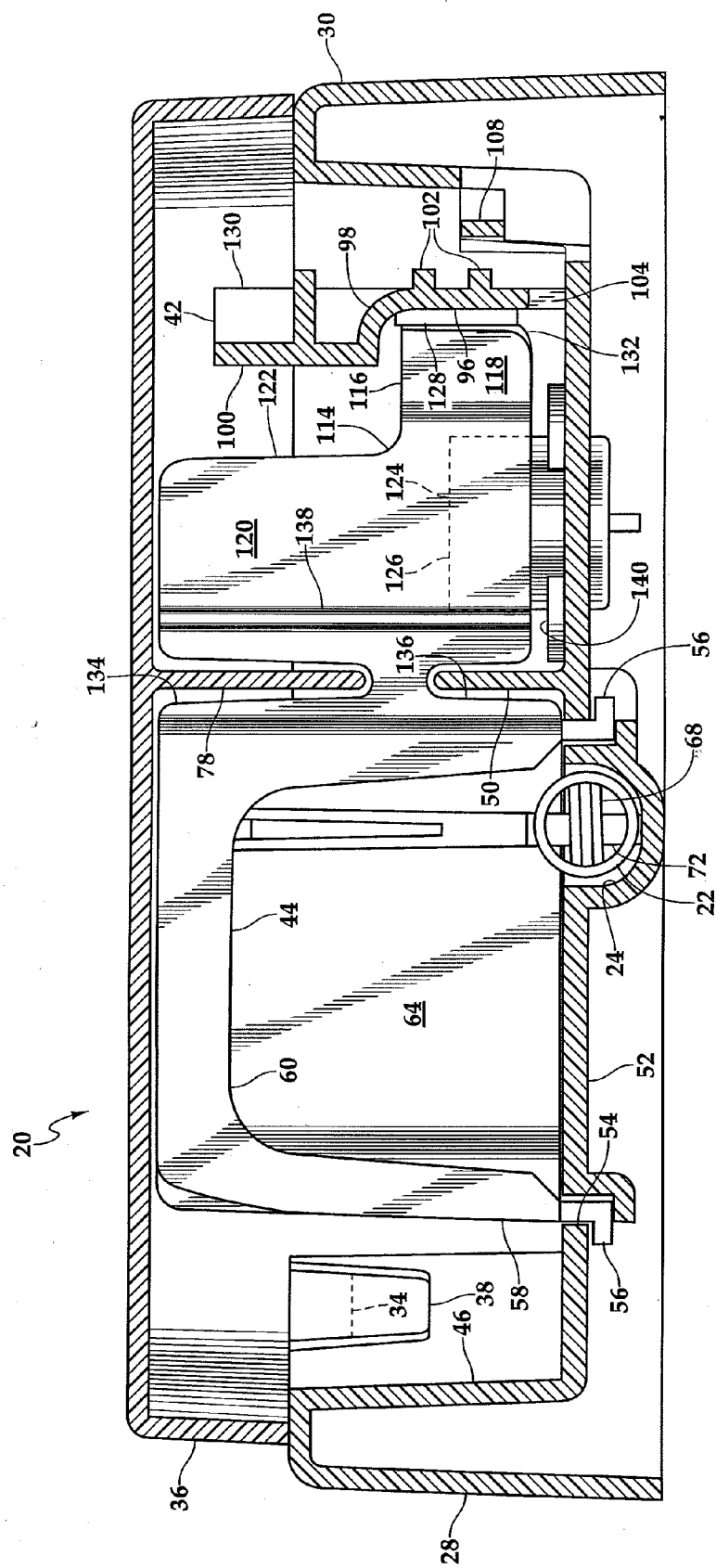
FIG. 4 is a cross-sectional view of the rodent trap of FIG. 2 taken along section line 4-4.

The trigger 42 is a molded plastic piece having two brackets 90 (only the top one being shown in FIGS. 1-3) with pin holes 92 through which the base pin 86 extends. The upper end of the pin 86 is supported against deflection in the direction of strike member movement by a protruding arc segment 94 which extends from the lid 36 adjacent the pin. The trigger 42 has a lower clearance wall 96 joined by a horizontal shelf 98 to a protruding upper wall 100, shown in FIGS. 1 and 2. The trigger 42 may be reinforced by outside ribs 102 running parallel to the shelf 98 as shown in FIG. 4. A tab 104 extends downwardly from the trigger clearance wall 96 near the end away from the brackets 90, and is received within a tab guide hole 106 formed in the floor 52 of the base 28. A spring 108 is integrally molded to protrude from the base interior wall 46 which has a free end 110, shown in FIG. 1, which engages the exterior of the trigger 42 and urges the trigger toward the strike member. The integral spring 108 may be formed with an upper lead-in ramp 112 to aid directing the trigger into place during assembly. The upper wall 100 of the trigger 42 extends into the trigger compartment 82 to narrow the compartment to increase the likelihood that a rodent passing through the compartment will engage the trigger.

As shown in FIG. 2, the strike member has a trigger engaging member 114 which projects from the strike member tunnel element 60 towards the trigger 42. The trigger engaging member 114 has a horizontal wall 116 which extends from the tunnel element 60 side wall 58 towards the trigger 42, and which joins a vertical wall 118. The vertical wall 118 extends downwardly along the entire inside edge of the horizontal wall 116, and extends upwardly to define a barrier wall 120. A clearance gap 122 is thus defined between the barrier wall 120 and the trigger upper wall 100. Through this gap 122 a rodent may detect the bait 124 contained within a removable bait cup 126, best shown in FIGS. 1 and 3. The bait cup 126 is positioned between the tunnel element 60 and the trigger 42. It is the bait which draws the rodent into the trigger compartment where it will not only activate the trigger, but also be best positioned for being struck in such a way as to be killed by portions of the strike member 44.

A catch 128 protrudes from the trigger lower wall 96 near the free end 130 of the trigger 42. The free end 132 of the vertical wall 118 of the trigger engaging member 114 abuts against the trigger catch 128, thereby holding the strike member 44 in its set position, with the tunnel element 60 extending from the trap interior 40 as shown in FIG. 2. In the set position, the strike member 44 is held against the force of the spring 22 which is urging the strike member towards its retracted configuration.

As best shown in FIG. 4, the trigger engaging member 114 is principally connected to the tunnel element 60 side wall 58 by the horizontal wall 116. An upper slot 134 and a lower slot 136 defined between the barrier wall 120 and the tunnel side wall 58 provide clearance for the upper barrier wall 78 and the lower barrier wall 50 as the strike member moves along the guide tracks 54. The lower clearance wall 96 of the trigger is recessed back from the trigger upper wall 100 to provide clearance for the trigger engaging member 114 as the strike member moves from its set configuration to a striking engagement with a captured rodent.

The strike member 44 has a vertical wall which acts as a strike plate 138 which extends in the direction of the strike member motion towards the rear of base 28. The strike plate 138 extends the full height of the barrier wall 120. As shown in FIG. 3, the strike plate 138 extends parallel to the rear barrier wall 48 but offset towards the trigger a small amount, for example about ⅛ inch. The strike plate 138 is an off-axis wall which extends towards the interior, and which is configured to strike portions of the rodent outside the tunnel element 60 when the trap 20 is triggered.

The operation of the trap 20 is illustrated in FIGS. 1 and 2. The user removes the bait cup 126 from the base 28 by rotating it to disengage the bait cup projecting flanges 140 from their engagement with the base floor 52 surrounding a bait cup opening 142 located within the trigger compartment 82. The user then places rodent bait 124, for example peanut butter, in the bait cup 126, and returns it to its position within the base 28. Because the bait cup 126 is removed and introduced through the underside of the base 28, the user need not remove the lid 36 from the trap. To set the trap, the user grips and pulls on the sidewardly projecting flanges 144 of the tunnel element 60 of the strike member 44 which are accessible exterior to the base 28. The tunnel element 60 is thus extended to reveal the two entryways 66 and the trigger engaging member 114 is brought forward until the integral spring 108 urges the trigger 42 to engage with the trigger engaging member, and thereby hold the strike member 44 in the set position as shown in FIG. 2.

One of the sidewardly projecting flanges 144 may have a protruding pointer 145, as shown in FIG. 1, which is always positioned outside the base interior and which extends over indicia 152 placed on the platform 26 of the base alongside one of the guide tracks 54. The indicia 152 may be molded into the base, or may be applied such as on an adhesive-backed label. The indicia include a region indicating that the trap is "set" as shown in FIG. 2, and another region, closer to the side wall 30 indicating that the trap has been activated and that a rodent has been "caught" as shown in FIG. 3. The words "set" and "caught" are spaced from each other in the axial direction of travel of the tunnel element 60, so that when the trap is in a position with the tunnel element extracted, the pointer 145 is near the indicium "set", and when the tunnel element is retracted substantially within the interior, the pointer is near the indicium "caught".

In the set position, the only access to the bait for a mouse 146 is through the entryways 66 and thence through a passageway 148 defined by the tunnel element 60, the lower barrier wall 50, the upper barrier wall 78, the lid 36 and the interior wall 46 on the entrance compartment 80 side of the base 28. When the mouse 146 enters the passageway 148, it must progress through the tunnel and then make a turn into the trigger compartment 82. As shown in FIG. 4, when the mouse looks into the trigger compartment the bait 124 is directly ahead, but shielded by the wall 118 of the trigger engaging member. The gap 122 presents a route to the bait 124. As the mouse moves towards the gap 122, it will engage against and displace sidewardly the upper wall 100 of the trigger 42, thereby causing the trigger to pivot about the pin 86 and releasing the trigger catch 128 from the free end of the 132 of the trigger engaging member 114 of the strike member 44. Once released from the trigger, the spring 22 accelerates the strike member along the axial path defined by the guide tracks 54 towards the rear of the base 28.

As shown in FIG. 3, this rapid retraction of the strike member brings the vertical wall 118 and the strike plate 138 into contact with the mouse 146 and forcibly displaces it towards the rear of the base. Because the mouse's head was within the trigger compartment when the trigger was engaged, it is likely that the strike plate 138 will crush the torso of the mouse 146 between the strike plate 138 and the wall 48 at the rear of the base, usually causing death. The tunnel element 60 may be a little more than 3 inches long. Because the mouse is partially within the trigger compartment when struck, there is adequate space within the trap to entirely contain the rodent's remains so that none will project beyond the trap interior. The retracted tunnel element 60 gives an easily perceived signal to the user that a mouse has been caught. The trap 20 and the mouse therein may then be disposed of by the user without the need to ever come directly in contact with the mouse remains.

It is understood that the invention is not limited to the particular construction and arrangement of parts herein illustrated and described, but embraces all such modified forms thereof as come within the scope of the following claims.

We claim:

1. A rodent trap comprising
a base;
an upstanding wall extending upwardly from the base to define a base interior, the wall having an opening which communicates with the base interior;
a tunnel element mounted to the base to extend through the opening in the upstanding wall, the tunnel element having at least one entrance opening to an interior of the tunnel element through which rodents can gain access to the base interior, the tunnel element mounted for travel on the base between a first position in which the at least one entrance opening is accessible by a rodent exterior to the base interior, and a second position in which the at least one entrance opening is retracted within the base interior and is not accessible by the rodent exterior to the base interior, the tunnel element travelling in a direction defining an axis, and the tunnel element having an off-axis wall which extends towards the base interior;
a spring extending between the base and the tunnel element which biases the tunnel element towards the second position; and
a trigger mounted to the base within the base interior and extending outside the tunnel element, the trigger configured to retain the tunnel element in the first position, until the trigger is engaged by a rodent leaving the tunnel element, such engagement releasing the tunnel element to travel to the second position under urging of the spring, such that the off-axis wall will strike portions of the rodent outside the tunnel element.

2. The rodent trap of claim 1 further comprising a trigger spring which biases the trigger towards the tunnel element.

3. The rodent trap of claim 1 wherein the base has a platform which projects beyond the base interior, and wherein a channel in the base platform receives the spring, and wherein at least one guide track is formed in the base to receive a projection from the tunnel element to guide it along a desired axial path.

4. The rodent trap of claim 1 wherein the trigger extends in generally the same direction as the tunnel element, but spaced sidewardly therefrom.

5. The rodent trap of claim 1 wherein a trigger engaging member extends from the tunnel element and comprises a horizontal wall projecting outwardly from a side wall of the tunnel element, and a vertical wall which extends upwardly from the horizontal wall to face towards the rodent leaving the tunnel element within the base interior.

6. The rodent trap of claim 1 further comprising a bait cup positioned within the base interior between the trigger and the tunnel element.

7. The rodent trap of claim 1 further comprising a lid which is connected to the base to further define the base interior, the lid having a barrier wall which extends downwardly into the base interior, and wherein the base has a barrier wall which extends upwardly into the base interior, the lid barrier wall and the base barrier wall extending between the tunnel element and the trigger.

8. The rodent trap of claim 1 further comprising a barrier extending within the base interior to define an entrance compartment which communicates with the interior of the tunnel element, and a trigger compartment into which the trigger extends, the trigger compartment communicating with the entrance compartment.

9. The rodent trap of claim 1 further comprising:
indicia associated with the base to indicate whether the trap is set or has been activated, the indicia being spaced from one another in the axial direction; and
indicator portions of the tunnel which extend outside the base interior and which point to one of the spaced indicia depending on whether the tunnel element is in the first position or the second position.

\* \* \* \* \*